United States Patent
Harding

(10) Patent No.: US 7,324,627 B2
(45) Date of Patent: Jan. 29, 2008

(54) APPARATUS FOR MEASURING THE MOMENTUM TRANSFER SPECTRUM OF ELASTICALLY SCATTERED X-RAY QUANTA AND METHOD OF DETERMINING THIS MOMENTUM TRANSFER SPECTRUM

(75) Inventor: Geoffrey Harding, Hamburg (DE)

(73) Assignee: GE Homeland Protection, Inc., Newark, CA (US)

( * ) Notice: Subject to any disclaimer, the term of this patent is extended or adjusted under 35 U.S.C. 154(b) by 63 days.

(21) Appl. No.: 11/304,423

(22) Filed: Dec. 15, 2005

(65) Prior Publication Data
US 2006/0159227 A1 Jul. 20, 2006

(30) Foreign Application Priority Data
Dec. 16, 2004 (DE) .................. 10 2004 060 610

(51) Int. Cl.
*G01N 23/201* (2006.01)
(52) U.S. Cl. .......................... 378/86; 378/62
(58) Field of Classification Search ............ 378/86–90, 378/145, 147, 149, 62, 57, 19
See application file for complete search history.

(56) References Cited
U.S. PATENT DOCUMENTS
6,054,712 A 4/2000 Komardin et al.
6,442,233 B1 8/2002 Grodzins et al.
2003/0031295 A1* 2/2003 Harding ..................... 378/86

FOREIGN PATENT DOCUMENTS
EP 1 241 470 B1 9/2003
EP 1347287 B1 7/2004

* cited by examiner

*Primary Examiner*—Hoon Song
(74) *Attorney, Agent, or Firm*—Eugene Hyun, Esq.; Armstrong Teasdale LLP

(57) ABSTRACT

An apparatus for measuring the momentum transfer spectrum of elastically scattered X-ray quanta includes an anode having a focus extended in Y-direction which emits X-radiation in the X-direction, a primary collimator extending in the Y-direction which allows through only X-radiation aimed at a single isocenter, wherein the isocenter is the originating point of a Cartesian coordinates system, an examination area, a scatter collimator arranged between said examination area and the isocenter and configured to allow through only scattered radiation from an object introduced in said examination area, wherein the radiation is emitted at a fixed angle of scatter ($\Theta$), and a detector. The X-component of a scatter voxel of the object is imaged onto the Z-component of the detector, and the detector is located in the Y-Z plane, distanced from the Z-axis, and developed as a two-dimensional pixellated detector having a plurality of energy-resolving detector elements.

6 Claims, 1 Drawing Sheet

APPARATUS FOR MEASURING THE MOMENTUM TRANSFER SPECTRUM OF ELASTICALLY SCATTERED X-RAY QUANTA AND METHOD OF DETERMINING THIS MOMENTUM TRANSFER SPECTRUM

CROSS REFERENCE TO RELATED APPLICATIONS

This Application claims the benefit of priority of Federal of Germany Patent Application No.: 102004060610.2, filed Dec. 16, 2004, which is hereby incorporated by reference in its entirety.

BACKGROUND OF THE INVENTION

This invention relates generally to an arrangement for measuring the momentum transfer spectrum of elastically scattered X-ray quanta and a method of determining the momentum transfer spectrum measured in the arrangement.

An apparatus for the examination of items of luggage is described in EP 1 241 470 B1. Such an apparatus has a focus extended in Y-direction which emits X-radiation in X-direction. Through a primary collimator extending in Y-direction only X-ray quanta which are aimed at a single isocentre are passed through into an examination area behind the isocentre. The isocentre forms the originating point of a Cartesian coordinates system and a disk-shaped inverted fan beam is thus formed. A scatter collimator system which is developed annularly about the Z-direction is arranged between the isocentre and the examination area. The result is that only scattered radiation from an object located in the examination area is passed through which emanates from the scatter voxel at a fixed preset angle of scatter. A detector which extends along the Z-axis is arranged in the Y-Z plane. Depth information regarding the scatter voxel, i.e. its X-coordinate, is thereby imaged onto a parallel of the Y-axis in the Y-Z plane. By means of such an arrangement a rapid analysis of an item of luggage can be achieved, with only a one-dimensional movement of the item of luggage along the Z-direction on a conveyor belt. The scanning speed is, however, limited by the angle-dependent sensitivity of the detector elements.

BRIEF DESCRIPTION OF THE INVENTION

An apparatus for measuring the momentum transfer spectrum of elastically scattered X-ray quanta is provided. The apparatus includes an anode having a focus extended in Y-direction which emits X-radiation in the X-direction, a primary collimator extending in the Y-direction which allows through only X-radiation aimed at a single isocentre, wherein the isocentre is the originating point of a Cartesian coordinates system, an examination area, a scatter collimator arranged between said examination area and the isocentre and configured to allow through only scattered radiation from an object introduced in said examination area, wherein the radiation is emitted at a fixed angle of scatter ($\Theta$), and a detector. The X-component of a scatter voxel of the object is imaged onto the Z-component of the detector, and the detector is located in the Y-Z plane, distanced from the Z-axis, and developed as a two-dimensional pixellated detector having a plurality of energy-resolving detector elements.

DETAILED DESCRIPTION OF THE INVENTION

Figure 1:
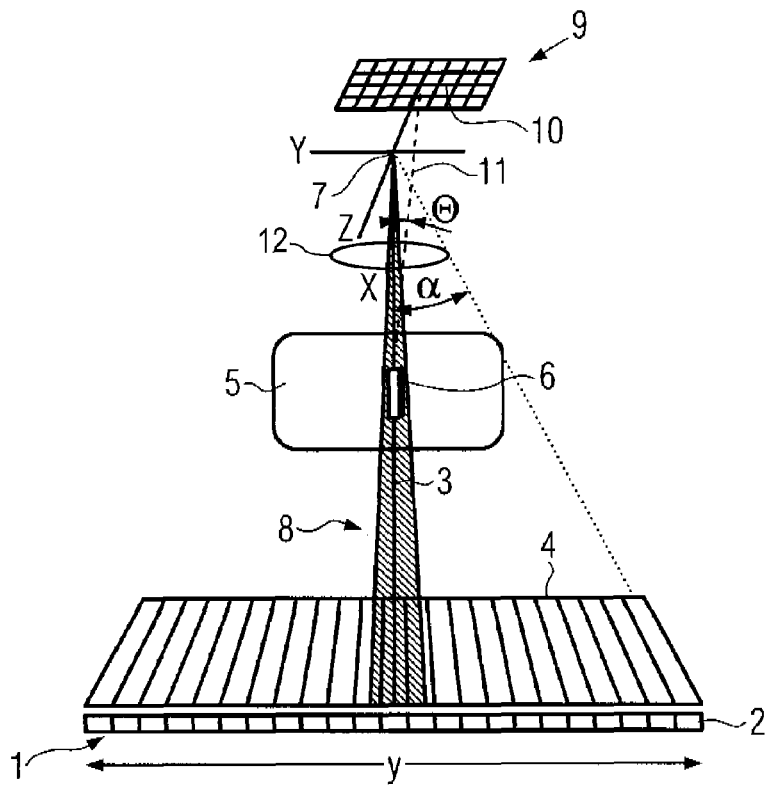
FIG. 1 a schematic view of an apparatus according to one embodiment of the invention that does not include a scatter collimator.

An embodiment of an apparatus according to the invention is schematically represented in FIG. 1. A section along the X-Y plane is shown. The apparatus according to the invention is represented in perspective at the top, i.e. in the region of the Y-Z plane.

The apparatus according to the invention has an anode 1 extending in a Y-direction which has a series of horizontally ranged discrete focus points 2 which move along anode 1 when fired upon by an electron beam. A number of focus points 2 are provided in an area (for reasons of clarity, only a small number of these focus points 2 are represented). The X-ray quanta emanating from each individual focus point 2 are bound by a primary collimator 4 which has a fan shape, such that an inverted fan beam 8 of X-ray quanta results as primary beam 3. This inverted fan beam 8 runs in the X-Y plane and converges on a single isocentre 7 which simultaneously forms the coordinates source of a Cartesian coordinates system. Primary beam 3 strikes an object 5 in the object area. In one embodiment, the apparatus is a luggage examination apparatus and object 5 is a suitcase. Object 5 then lies on a conveyor belt (not shown) which can be moved along the Z-axis. As long as object 5 is not moved along the Z-axis by the conveyor belt, inverted fan beam 8 passes through object 5 along a thin slice in the X-Y plane. This slice is changed by a one-dimensional movement of the conveyor belt in the Z-direction, so that a complete scanning of object 5 can be carried out by moving the conveyor belt.

The momentarily scanned thin slice consists of a number of scatter voxels 6, each of which has an X-coordinate (varying depth along the X-direction) and a Y-coordinate (varying lateral arrangement with regard to the X-axis). At each individual scatter voxel 6, primary beam 3 of X-ray quanta is scattered. Of the X-ray quanta scattered at this scatter voxel 6, only the coherently scattered X-ray quanta are of interest in this embodiment. These quanta are imaged into the Y-Z plane by means of a scatter collimator system 12, such as that described in EP 1 241 470 B1, so that a direct allocation to the depth of scatter voxel 6 takes place along the X-direction in object 5. Accordingly, in the exemplary embodiment, only X-ray quanta scattered at scatter voxel 6 which have a preset constant scatter angle $\Theta$ are allowed through by the scatter collimator 12 as a scatter beam 11. Scatter beam 11 allowed through is represented by a dotted line in FIG. 1.

Due to the scatter collimator 12 developed annularly about the Z-direction, not only scatter quanta in the X-Z plane pass through this but also those which have a coordinate other than Y=0. These quanta are recorded by a two-dimensional detector 9 arranged in the Y-Z plane. The detector apparatus described in EP 1 241 470 B1 extends only along the Z-axis. According to an embodiment of the present invention, the individual scatter detector elements 10 extend in the Y-direction. More scatter quanta of scatter beam 11 emanating from scatter voxel 6 which are allowed through by the scatter collimator 12 and belong to the fixed angle of scatter Θ are thereby recorded by detector 9. The more scatter quanta that are recorded, the less time is required to record the momentum transfer spectrum of the elastically scattered X-ray quanta.

Detector 9 is a detector array arranged in the Y-Z plane. Detector 9 is arranged at a distance from the Y-axis. The distance is chosen so that scatter beams 11 emanating from scatter voxel 6 strike it at an angle of scatter Θ less than 10°. This narrow forward angle in the elastic scatter is used, for example, with regard to explosives for which the momentum transfer function displays have a distinct peak which decreases markedly for larger angles of scatter. Detector 9 is composed of a plurality of individual detector elements forming a detector array. Each individual detector element 10 is individually readable and energy-resolving. The momentum transfer function can also be allocated along the Y-axis for each individual scatter voxel 6, whatever its depth (the X-coordinate display) in object 5. A larger solid angle is thereby obtained for which the elastically scattered X-ray quanta belonging to scatter voxel 6 in question can be detected. More scatter quanta 11 are thereby detected than would be the case if only detector elements 10 were arranged along the Z-axis. The result is thus either a better resolution due to the increased signal-to-noise ratio, or a significantly shortened scanning time of object 5 with a signal-to-noise ratio that is unchanged vis-à-vis the state of the art. Due to the imaging geometry, detector elements 10 allocated to a scatter voxel 6 travel on an elliptical path which runs symmetrical to the Z-axis and aligns itself to the Y-axis as the distance from the Z-axis increases.

However, the shape of the ellipse depends not only on the depth of the scatter voxel 6 inside object 5, i.e. on its X-coordinate, but also on the primary beam emission angle α which the scatter voxel 6 forms with the X-axis. The relationship between the diffraction profile which is defined by the momentum transfer x and the energy spectrum results in the equation:

$$x = \frac{\sin(\Theta/2)}{\lambda}$$

The angle of scatter Θ is composed of two components, one with a Z-portion and the other with a Y-portion. On the basis of known trigonometric functions the result is that the value of the momentum transfer x also depends on the primary beam emission angle α which strikes scatter voxel 6.

Figure 2:
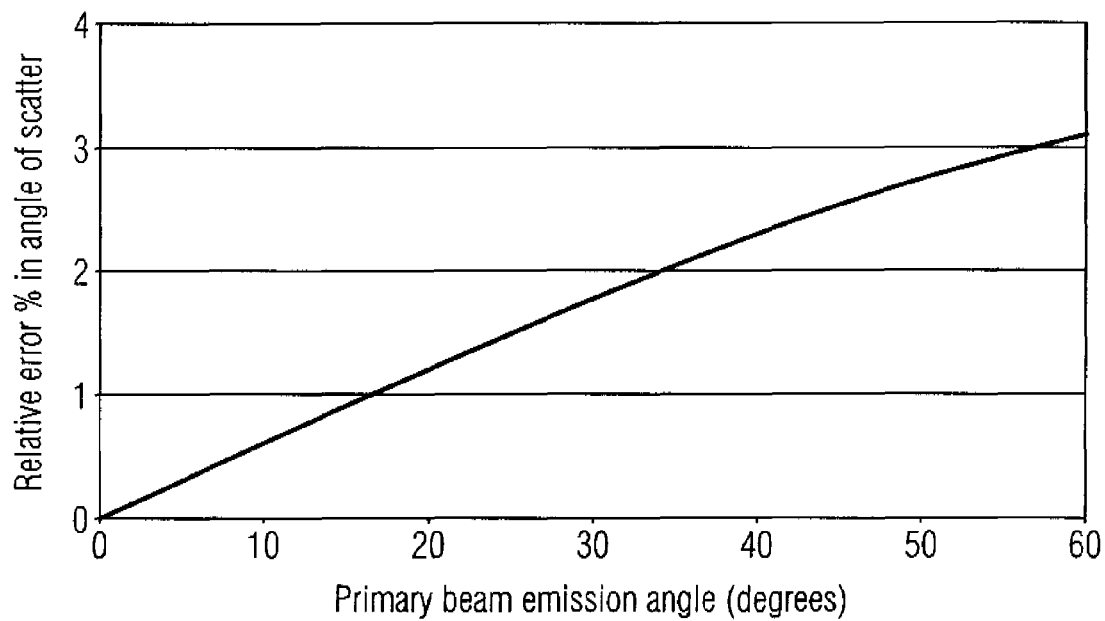
FIG. 2 illustrates the relationship between the relative error in the angle of scatter and the primary beam emission angle.

The relative error depending on the angle of scatter is set off as the ordinate in FIG. 2 as percent against the primary beam emission angle α in degrees. It is shown in FIG. 2 that the relative error increases from 0% for a primary beam emission angle α of 0° to over 3% for a primary beam emission angle α of 60°. This relationship can be used to carry out a precise correction for all primary beam emission angles α, even for primary beam emission angles α as large as 60°. Accordingly, there is no blurring effect when determining the momentum transfer spectrum for the elastically scattered X-ray quanta of each individual scatter voxel 6.

Due to the possibility of choosing a very large primary beam emission angle α, a very large opening angle of inverted fan beam 8, a part of which is represented in hatch-shading in FIG. 1, can be achieved. Through the apparatus according to the exemplary embodiment of the invention it is possible to obtain an opening angle of 90° without problems. This means that the distance between isocentre 7 and anode 1 is smaller vis-à-vis an arrangement known from the state of the art with a smaller opening angle of the inverted fan beam 8 and yet an object 5 of the same cross-section area can nevertheless be scanned. This reduces the problem of fitting the system into a logistical chain, for example at an airport, and permits scanning of hand luggage with a system height of only 1.5 m.

The individual detector elements 10 of the detector array are, in one embodiment, fabricated from CdZnTe, as these resolve energy very well and additionally are operable at room temperature or with slight cooling (Peltier cooling).

As described above, because the detector is developed as a two-dimensional pixel detector, scatter quanta can be recorded not only along the Z-axis but spatially resolved over a larger solid angle. In the exemplary embodiment, a pixellated detector is a detector array which has individual detector elements which, independently of each other, record the striking scattered radiation. The detector array could either be a single crystal or several spatially separated detector elements. Each individual detector element can have a read-out chip. Such pixellated detectors are used in the field of medicine. By recording scatter quanta which also strike the detector alongside the Z-axis, a larger solid angle can be covered and the signal-to-noise ratio is increased, or a shorter scanning time is obtained for the object than is possible with an arrangement according to known arrangements.

In the exemplary embodiment of the invention, each individual detector element can be read out separately. Thus the imaging geometry of the arrangement is taken into account, as the scatter quanta which stem from an elastic scatter do not run on a straight line perpendicular to the Z-axis in the Y-Z plane but, at greater distances from the Z-axis, move on an elliptical curve to the Y-axis. Thus those detector elements which stem from the same scatter voxel can be read out. Moreover, through the arrangement as a detector array, account can be taken of the further effect that the shape of the ellipse on which the elastically scattered X-ray quanta belonging to a scatter voxel strike the detector also depends on the angle of the primary beam to the X-axis (primary beam emission angle). It is thereby guaranteed that an exact determination of the momentum transfer spectrum is always possible for each individual scatter voxel, irrespective of its location in the object and thus regardless of the primary beam emission angle.

In addition, the length of the extended focus in the Y-direction and the single isocentre are matched to each other such that there is an opening angle of 60° to 120° at the isocentre. In one embodiment, the opening angle is 90° at the isocentre. The angle which is swept by the primary beam and which determines the maximum size of the cross-section of the object to be examined is thereby increased substantially vis-à-vis the state of the art. Ordinary objects, for example suitcases undergoing security checks at airports, can thus be examined in the same time in an arrangement having a structure that is shorter than known structures.

With regard to the method of operation, since the imaging geometry of the apparatus is known, the measurement results in the individual detectors can be corrected depending on each individual scatter voxel in the object from which the detected elastically scattered X-ray quanta stem. The additional correction of the measurement values in the individual detectors depending on the primary beam emission angle makes it possible, even for scatter voxels which lie a very long way from the X-axis, to record the momentum transfer function without blurring effects, as the quality of the diffraction profiles is not less.

While the invention has been described in terms of various specific embodiments, those skilled in the art will recognize that the invention can be practiced with modification within the spirit and scope of the claims.

What is claimed is:

1. Apparatus for measuring a momentum transfer spectrum of elastically scattered X-ray quanta comprising:
    an anode having a focus extended in a Y-direction which emits X-radiation in an X-direction;
    a primary collimator extending in the Y-direction which allows through only X-radiation aimed at a single isocentre, wherein the isocentre is an originating point of a Cartesian coordinates system;
    an examination area;
    a scatter collimator arranged between said examination area and the isocentre and configured to allow through only scattered radiation from an object introduced in said examination area, wherein the radiation is emitted at a fixed angle of scatter ($\Theta$); and
    a detector, wherein an X-component of a scatter voxel of the object is imaged onto a Z-component of the detector, and the detector is located in a Y-Z plane, distanced from a Y-axis, and developed as a two-dimensional pixellated detector having a plurality of energy-resolving detector elements, the plurality of detector elements extending at least in the Y-direction.

2. Apparatus according to claim 1 wherein each of the plurality of individual detector elements is independently read out.

3. Apparatus according to claim 1 wherein each of the plurality of detector elements comprises CdZnTe.

4. Apparatus according to claim 1 wherein a length of the extended focus in the Y-direction and the single isocentre are matched to each other such that there is an opening angle of the X-ray beam of 60° to 120°.

5. Apparatus according to claim 4 wherein the opening angle is 90° at the isocentre.

6. A method of determining the momentum transfer spectrum measured in the apparatus according to claim 1 wherein the measurement values of each of the plurality of detector elements is corrected depending on a primary beam emission angle ($\alpha$) and on a position of the detector element relative to the scatter voxel and the angle of scatter ($\Theta$) resulting therefrom.

* * * * *